UNITED STATES PATENT OFFICE.

PARKER C. McILHINEY, OF GREAT NECK, NEW YORK, ASSIGNOR TO CALIFORNIA ALKALI COMPANY, OF SAN FRANCISCO, CALIFORNIA, A CORPORATION OF CALIFORNIA.

PROCESS FOR THE RECOVERY OF POTASSIUM SALTS.

1,338,234.     Specification of Letters Patent.     Patented Apr. 27, 1920.

No Drawing.     Application filed February 11, 1918. Serial No. 216,513.

*To all whom it may concern:*

Be it known that I, PARKER C. McILHINEY, a citizen of the United States, and a resident of Great Neck, North Hempstead, Nassau county, State of New York, (whose post-office address is 50 East 41st street, New York city, N. Y.,) have invented certain new and useful Improvements in Processes for the Recovery of Potassium Salts, of which the following is a specification.

My present invention has relation to an improved process for obtaining chlorate of potassium in commercially pure form directly from solutions containing a soluble salt of potassium and borax usually associated with other salts in certain natural waters. It is to be understood that, although primarily useful in the extraction of potassium salts from brines actually found in nature, my invention is also applicable to similar solutions artifically prepared. It is an important advantage of my invention that it supplies a method of manufacturing potassium chlorate directly and economically from natural brines containing borax, instead of making it, as heretofore, from commercial potassium chlorid.

My improved process will be found particularly useful in its application to the types of brines formed in Searles Lake and Owens Lake in California, wherein potassium chlorid occurs associated with chlorid, sulfate and borate of sodium.

The sodium borate in these and similar brines has offered especial difficulties in the way of successful separation largely owing to the fact that its relative solubilities in hot and cold water are substantially the same as those of potassium chlorid. This fact makes it impossible to separate the borate from the potassium chlorid by concentration in a hot solution, followed by cooling, as is generally practised in separating the chlorids of sodium and potassium. In view of these difficulties, particularly, the many processes hitherto proposed for extracting potassium salts from brines of the character found in Owens Lake, for instance, have been indirect, tedious and expensive, and it is the principal object of my invention to supply a process whereby direct extraction of potassium chlorate is accomplished, and a considerable economy of time and money is attained.

I have discovered that potassium chlorate can be obtained by direct separation from solutions containing borax by adding to such solution in which the potassium occurs, generally as a chlorid or sulfate, a soluble salt of chloric acid, such as sodium calcium or magnesium chlorate. When a reagent of this character is employed the basic element of the soluble chlorate replaces the potassium in the chlorid or sulfate, remaining in solution, while insoluble potassium chlorate is formed, which can be separated either as a precipitate or by slow crystallization.

Taking the water of Owens Lake as an example whereby to illustrate my complete process, I find it best first to remove the sulfate and most of the carbonate of sodium together with the major part of the sodium chlorid. For this purpose the natural brine is first evaporated to a certain proper concentration, when it is treated with carbonic acid to convert the soluble sodium carbonate into the relatively insoluble bicarbonate, thereby separating a large part of the carbonate by precipitation. This having been accomplished, a further evaporation, either by solar heat or by the use of fuel, will cause separation of the sodium sulfate together with a further portion of the bicarbonate and most of the sodium chlorid in solid form. The potassium chlorid and borax, being much more soluble will remain in solution, with a small proportion of the sodium chlorid.

It now remains to separate the potassium from the borax, and for this purpose the solution should first be evaporated to such a concentration as corresponds to saturation by the potassium chlorid if the solution were cold. Even a higher concentration than this will be found advantageous, care being taken not to saturate the solution hot, by which is meant a temperature of from 90 to 100 degrees C. This concentration is not essential to the process, but I prefer to resort to this step for reasons of economy and convenience which will be obvious.

The hot solution having been thus prepared, I next add thereto a chlorate of sodium calcium or magnesium either in solution or in solid form. The proportion of soluble chlorate used can readily be calculated by any chemist, having in view the reaction above described. As already stated, the insoluble potassium chlorate may be obtained as a precipitate, but it will be found more advantageous to add the soluble reagent either in solid form or in a hot solution, and thus to maintain the temperature of the whole mass at such a point that separation of the potassium chlorate will not occur at once. By letting the solution cool gradually, after the reaction, the potassium chlorate will separate slowly in relatively large crystals. This formation will obviously contribute materially to the purity of the product obtained.

As a variant or modification of my process which is within my invention as broadly claimed, I may produce a soluble chlorate within the solution itself, for the purpose of reacting with the potassium salt in the solution as already described. For this purpose, after the sodium sulfate has been removed by concentration as described, I pass substantially pure chlorin into the solution, whereupon it reacts with the sodium carbonate to form sodium chlorate, which in turn reacts as before stated to form potassium chlorate.

It is one advantage of such a process that the reaction involved serves both to assist in removing the objectionable sodium carbonate and to make this salt useful in production of the desired reagent.

My improved process can be varied in many ways which will be obvious to those skilled in the art, having due regard to the particular circumstances of each case, and I do not limit myself to the particular details herein set forth.

Having described my invention, what I claim as new and desire to secure by Letters Patent is:

1. The process of obtaining potassium chlorate directly from natural brines or similar solutions containing a soluble potassium salt associated with borax, which consists in causing a reagent including a soluble chlorate to react with said potassium salt, and removing the insoluble potassium chlorate resulting from the reaction.

2. The process generally described in claim 1 hereof wherein the reagent used is formed in the solution containing the soluble potassium salts.

3. The process generally described in claim 1 hereof wherein the solution treated is kept hot during the reaction, and wherein the potassium salt is crystallized out by gradually cooling the solution.

4. The process generally described in claim 1 hereof wherein the solution is concentrated by evaporation before it is subjected to the reagent to such a point as to correspond approximately to saturation by the soluble potassium salt when cold.

5. The process generally described in claim 1 hereof as applied to brine containing sodium carbonate, wherein the carbonate is removed by evaporation and concentration before the reagent becomes effective.

6. The process generally described in claim 1 hereof as applied to brine containing sodium carbonate, wherein the solution is treated with carbonic acid to convert the carbonate into relatively insoluble bicarbonate and separating the latter before converting the potassium into chlorate.

7. The process generally described in claim 1 hereof as applied to brine containing sulfate of sodium wherein the sulfate is separated by evaporation and concentration before the reagent becomes effective.

8. The process generally described in claim 1 hereof as applied to brine containing sodium chlorid wherein the sodium chlorid is largely separated by evaporation and concentration before the reagent becomes effective.

9. The process generally described in claim 1 hereof wherein sodium chlorate is used as the reagent.

10. The process generally described in claim 1 hereof wherein sodium chlorate is the reagent and the solution is kept hot during the reaction, and also wherein the potassium salt is crystallized out by gradually cooling the solution.

11. The process generally described in claim 1 hereof wherein the reagent which reacts with the potassium salt is formed within the solution to be treated by passing chlorin into the solution.

12. The process generally described in claim 1 hereof as applied to a solution containing sodium carbonate wherein the soluble chlorate used as a reagent is formed within the solution by causing chlorin to react with said sodium carbonate.

13. The process generally described in claim 1 hereof as applied to brine containing sodium carbonate, wherein the solution is treated with carbonic acid for the removal of part of the sodium as bicarbonate, and wherein the reagent is formed within the solution under treatment by passing chlorin into said solution.

14. The process generally described in claim 1 hereof as applied to brine containing sodium carbonate, wherein the solution is concentrated and treated with carbonic acid to remove a part of the carbonate, subsequently concentrating the remaining solution and treating the remaining solution with chlorin to form the reagent.

In testimony whereof, I have signed my name to this specification.

PARKER C. McILHINEY,